US008957175B1

(12) United States Patent
Nowak et al.

(10) Patent No.: US 8,957,175 B1
(45) Date of Patent: Feb. 17, 2015

(54) LOW TEMPERATURE SEGMENTED COPOLYMER COMPOSITIONS AND METHODS

(71) Applicant: The Boeing Company, Seal Beach, CA (US)

(72) Inventors: Andrew P. Nowak, Los Angeles, CA (US); Chaoyin Zhou, Chino, CA (US); Richard E. Sharp, Weldon Springs, MO (US)

(73) Assignee: The Boeing Company, Chicago, IL (US)

( * ) Notice: Subject to any disclaimer, the term of this patent is extended or adjusted under 35 U.S.C. 154(b) by 24 days.

(21) Appl. No.: 13/716,084

(22) Filed: Dec. 14, 2012

Related U.S. Application Data

(63) Continuation-in-part of application No. 12/777,264, filed on May 11, 2010, now Pat. No. 8,334,356.

(51) Int. Cl.
*C08G 77/26* (2006.01)
*C08G 77/388* (2006.01)

(52) U.S. Cl.
CPC .................................. *C08G 77/388* (2013.01)
USPC ............................................. 528/38; 528/28

(58) Field of Classification Search
CPC ......... C08G 77/26; C08G 77/16; C08G 18/61
USPC .................................................... 528/38, 28
See application file for complete search history.

(56) References Cited

U.S. PATENT DOCUMENTS

| 6,313,254 | B1 * | 11/2001 | Meijs et al. | 528/26 |
| 7,262,260 | B2 | 8/2007 | Yilgor et al. | |
| 2002/0028901 | A1 * | 3/2002 | Gunatillake et al. | 528/28 |

OTHER PUBLICATIONS

Allan F. M. Barton, Ph.D., "CRC Handbook of Solubility Parameters and Other Cohesion Parameters", 1983, CRC Press, Inc., Boca Raton, Florida, 13 pages.
Clarson, et al., "Studies of Cyclic and Linear Poly(dimethylsiloxanes):19, Glass Transition Temperatures and Crystallization Behaviour", Polymer, Jun. 1985, pp. 930-934, vol. 26.
Dollase, et al., "Crystallization of PDMS: The Effect of Physical and Chemical Crosslinks", Europhysics Letters, Nov. 2002, pp. 390-396, 60(3).
Ho, et al., "Polydimethylsiloxane-Urea-Urethane Copolymers with 1,4-Benzenedimethanol as Chain Extender", Macromolecules, 1993, pp. 7029-7036, vol. 26, No. 25.
Kricheldorf, et al., "Handbook of Polymer Synthesis", Second Edition, 2005, Marcel Dekker, Monticello, New York, Chapter 8, Polyurethanes, pp. 503-539 (total 42 pages with cover pages and table of contents).
Petrovic, et al., "Polyurethane Elastomers", Prog. Polymer Science, 1991, pp. 695-836, vol. 16.
Eugene G. Rochow, "Silicon and Silicones", 1987, Springer-Verlag, Berlin, Germany, 24 pages.
Sheth et al., "Structure-Property Behavior of Poly(dimethylsiloxane) Based Segmented Polyurea Copolymers Modified with Poly(propylene oxide)", Polymer, 2005, pp. 8185-8193, vol. 46.
Sheth et al., "Influence of System Variables on the Morphological and Dynamic Mechanical Behavior of Polydimethylsiloxane Based Segmented Polyurethane and Polyurea Copolymers: A Comparative Perspective", Polymer 2004, pp. 6919-6932, vol. 45.
Tyagi et al., "Segmented Organosiloxane Copolymers: 2 Thermal and Mechanical Properties of Siloxane-Urea Copolymers", Polymer, Dec. 1984m, pp. 1807-1816, vol. 25.
Yang, et al., "Synthesis and Characterization of Polydimethyl Polyureas-Urethanes and Related Zwitterionomers", Journal of Polymer Science: Part B: Polymer Physics, 1991, pp. 75-86, vol. 29.
Shin-Etsu Chemical Co., Ltd. Catalog, "Characteristic Properties of Silicone Rubber Compounds", 2005, Tokyo, Japan, 16 pages.

* cited by examiner

*Primary Examiner* — Kuo-Liang Peng

(57) ABSTRACT

There is provided segmented copolymer compositions and methods of making the same. The composition has one or more $\alpha,\omega$ (alpha, omega) amine or $\alpha,\omega$ (alpha, omega) hydroxyl terminated polysiloxane first soft segments having an average molecular weight of between about 2500 grams per mole to about 10,000 grams per mole. The composition further has one or more diisocyanate species. The composition further has one or more low molecular weight diol or diamine chain extenders each having an average molecular weight of less than 400 grams per mole. The composition has a high flexibility at an environmental temperature of down to about −100 degrees Celsius, and further has a percent elongation of greater than about 250%, a high tensile strength of greater than about 25 MPa (megapascals), and a single low glass transition temperature (Tg) in a range of from about −60 degrees Celsius to about −110 degrees Celsius.

6 Claims, 8 Drawing Sheets

Compositional Data for Examples 1-4

| Sample | PDMS | Fluorinated Block | NCO | Chain Extender (CE) | HS% | Composition PDMS/NCO/CE |
|---|---|---|---|---|---|---|
| Example 1 | Mn=5600 | -- | HMDI | DAC | 24.5 | 1/5/4 |
| Example 2 | Mn=5600 | -- | HMDI | DAC / Et100 | 25.0 | 1/5/(3/1) |
| Example 3 | Mn=5600 | ZDol 4000 | HMDI | DAC | 26.7 | (0.6/0.4)/5/4 |
| Example 4 | Mn=5600 | ZDol 4000 | HMDI | DAC/Et100 | 27.4 | (0.6/0.4)/5/(3/1) |

FIG. 2

Mechanical Testing Data for Examples 1-4

| Sample | Modulus (MPa) @ 25°C | Tensile Strength (MPa) @ 25°C | % Elongation | Composition PDMS/NCO/CE |
|---|---|---|---|---|
| Example 1 | 9.3 | 48 | 473 | 1/5/4 |
| Example 2 | 14.9 | 36 | 394 | 1/5/(3/1) |
| Example 3 | 66 | 36 | 320 | (0.6/0.4)/5/4 |
| Example 4 | 74 | 40 | 305 | (0.6/0.4)/5/(3/1) |

FIG. 3

Solvent Compatability Testing Parameters

| Fluid | Time Exposure | Temperature Exposure |
|---|---|---|
| Jet fuel | 7 days | Ambient |
| Engine Oil | 24 hr | 120°C |
| Hydraulic Fluid | 7 days | Ambient |
| Deionized Water | 7 days | 49°C |

FIG. 4

Mass and Volume Change Following Fluid Exposure for Examples 1-4

|  |  | Example 1 | Example 2 | Example 3 | Example 4 |
|---|---|---|---|---|---|
| % Mass Change | Lubricating Oil | 23.9 | 20.3 | 18.4 | 15.0 |
|  | Hydraulic Fluid | 30.7 | 40.5 | 7.9 | 14.7 |
|  | Jet Fuel | 142 | 90.8 | 36.9 | 43.6 |
|  | Water | 0.6 | -2.4 | 1.1 | 4.3 |
| % Volume Change | Lubricating Oil | 31.8 | 50.6 | 11.8 | 14.6 |
|  | Hydraulic Fluid | 34.7 | 25.0 | 6.9 | 13.2 |
|  | Jet Fuel | 191 | 82.5 | 48.1 | 49.0 |
|  | Water | 2.0 | 7.0 | 1.1 | 0.6 |

FIG. 5

LOW TEMPERATURE SEGMENTED COPOLYMER COMPOSITIONS AND METHODS

CROSS-REFERENCE TO RELATED APPLICATION

The present application is a continuation-in-part application of and claims priority to pending U.S. patent application Ser. No. 12/777,264, filed May 11, 2010, entitled "LOW TEMPERATURE SEGMENTED COPOLYMER COMPOSITIONS AND METHODS", which is incorporated herein by reference in its entirety.

BACKGROUND

1) Field of the Disclosure

The disclosure relates to segmented copolymers, and in particular, to polydimethylsiloxane (PDMS)-urethane/urea segmented copolymers.

2) Description of Related Art

Elastomeric materials are required in a broad variety of applications including use in low temperature environments. However, many known elastomers do not maintain their advantageous elastic properties at low temperatures because such known elastomers may comprise polymer species that cause the elastomers to stiffen and become brittle below their glass transition temperatures (Tg). In addition, known polymers such as polysiloxanes and polyfluoroethers that are able to individually maintain flexibility at low temperatures can have reduced mechanical strength at low temperatures.

Segmented polysiloxane-urea copolymers are known, such as those disclosed in U.S. Pat. No. 7,363,360 to Yilgor et al. However, Yilgor et al. requires that a polyether segment be incorporated between the siloxane and urea hard segments in order to improve mechanical properties. Such an intermediate polyether segment introduces a structural element into the polymer system with a higher glass transition temperature (Tg) of approximately −50° C. that can reduce the low temperature range over which the material is elastic.

Elastomeric materials that possess the ability to demonstrate a high degree of toughness through both high elongation and tensile strength find application in a variety of environments. One example of this is the aerospace environment where low temperatures (less than −50° C.) are common. There is a need for materials that can maintain classic elastic properties and continue to demonstrate high degrees of toughness in these demanding environments. Many known elastomeric materials can undergo an abrupt increase in modulus of many orders of magnitude greater than −50° C. as temperature is lowered. This is due to the polymeric components that make up these materials possessing glass transition temperatures above the environmental temperature where such materials would find application.

It is desirable for elastomeric materials to be able to be formulated into a form that can be conveniently prepared and applied in the field. This can require precursor components that are capable of being stored and stable over acceptable time periods. Once activated, the elastomeric materials may demonstrate an acceptable pot life or be suspended in a medium that allows for convenient application. Low general toxicity of individual components, chemical resistance to fluids commonly found in aerospace environments, and the ability to be compounded with filler materials are also desirable.

Elastomeric materials and systems typically have chains with high flexibility and low intermolecular interactions and either physical or chemical crosslinks to prevent flow of chains past one another when a material is stressed. For an elastomeric material or system to demonstrate good elastic behavior at low temperatures, it is desirable that it be composed of elements that have low glass transition temperatures. Materials with low glass transition temperatures can have highly flexible chains with less flexible interchain interactions. Examples of polymer materials that have low glass transition temperatures are PDMS and fluoroethers. However, these materials may have reduced mechanical properties due to the fact that they are well above their Tg under ambient conditions. In order to compensate for this, silicone based materials and systems are known but may be formulated with fillers and heavily crosslinked to bring the mechanical properties of the final form to an acceptable level. Heavy crosslinking in PDMS based materials and systems can result in an increase in Tg from −120° C. associated with the linear chains due to crystallization effects and narrowing of the low temperature range over which the material is elastic. Thus, an alternative method to covalent crosslinking for reducing chain mobility in siloxane based elastomer systems is desired in order to maintain flexibility in these systems at low temperature.

One known method available to produce a physically crosslinked elastomer is the use of segmented polyurethane or urea systems. These species demonstrate strong hydrogen bonding potential between them and as a result can create strong associative forces between the chains. In order to produce elastomeric materials, regions of highly flexible and weakly interacting chains must be incorporated with strongly associating elements. This can be accomplished using a segmented copolymerization scheme. Segmented copolymers provide a straightforward synthetic route toward block architectures using segments with vastly differing properties. The end result of such synthesis are typically chains that possess alternating hard and soft segments composed of regions of high urethane bond density and the chosen soft segment component (e.g., siloxane), respectively. This covalent linkage of dissimilar hard and soft blocks drives the systems to microphase separation and creates regions of flexible soft blocks surrounding regions of hard blocks. The associative forces among the hard segments prevent flow under stress and can produce elastomeric materials capable of displaying high elongation and tensile strength.

PDMS as a soft segment component in a segmented polyurethane urea system for an elastomeric material that demonstrates low glass transition is known. In addition, silicone-urethane/urea systems are known. It is further known that differences in solubility parameter between PDMS and urea/urethane segments can provide a strong driving force toward microphase separation. Such sharp interfaces created in these materials can result in low values of elongation and tensile strength. Known methods exist to reduce the sharpness of the transition between the hard and soft segments in siloxane-urea materials by incorporating a second soft segment that can act as an interface creating a gradient between the two highly dissimilar materials. For example, polypropylene oxide (PPO) segments have been incorporated into segmented siloxane-urea materials in order to improve mechanical properties. However, while the PPO segments may increase tensile strength and elongation, the PPO introduces a second glass transition temperature into the overall material which can be much higher than the glass transition temperature of PDMS greatly reducing the low temperature range over which the material is elastic.

Moreover, known filled elastomer based coatings, gap fillers and sealants can lack robust durability, especially under environmental extremes such as low temperatures, (e.g., −50° C.).

Accordingly, there is a need for segmented elastomeric copolymer compositions and methods that provide advantages over known compositions and methods.

SUMMARY

This need for segmented elastomeric copolymer compositions and methods is satisfied. Unlike known segmented elastomeric copolymer compositions and methods, embodiments of the segmented elastomeric copolymer compositions and methods provide numerous advantages discussed in further detail in the below detailed description.

In an embodiment of the disclosure, there is provided a segmented copolymer composition. The composition comprises one or more α,ω (alpha, omega) amine or α,ω (alpha, omega) hydroxyl terminated polysiloxane first soft segments having an average molecular weight of between about 2500 grams per mole to about 10,000 grams per mole. The composition further comprises one or more diisocyanate species. The composition further comprises one or more low molecular weight diol or diamine chain extenders. The composition preferably has a high flexibility at an environmental temperature of down to about −100 degrees Celsius, and further has a percent elongation of greater than about 250%, a high tensile strength of greater than 25 MPa (megapascals), and a single low glass transition temperature (Tg) in a range of from about −60 degrees Celsius to about −110 degrees Celsius. The composition may further comprise one or more additional second soft segments, preferably comprising perfluoropolyether soft segments.

In another embodiment of the disclosure, there is provided a segmented elastomeric copolymer composition. The composition comprises one or more α,ω (alpha, omega) amine or α,ω (alpha, omega) hydroxyl terminated polydimethylsiloxane (PDMS) soft segments having an average molecular weight of between about 4000 grams per mole to about 7000 grams per mole, wherein the one or more PDMS soft segments is present in an amount of from about 60% by weight to about 85% by weight, based on a total weight percent of the composition. The composition further comprises one or more hard segments present in an amount of from about 15% by weight to about 40% by weight, based on the total weight percent of the composition, wherein the one or more hard segments comprise a combination of one or more cycloalkyl based diisocyanate species and one or more low molecular weight diol or diamine chain extenders. The composition preferably has a high flexibility at an environmental temperature of down to about −100 degrees Celsius, and further has a percent elongation of greater than about 250%, a high tensile strength of greater than 25 MPa (megapascals), and a single low glass transition temperature (Tg) in a range of from about −60 degrees Celsius to about −110 degrees Celsius.

In another embodiment of the disclosure, there is provided a segmented elastomeric copolymer composition. The composition comprises one or more α,ω (alpha, omega) amine or α,ω (alpha, omega) hydroxyl terminated polydimethylsiloxane (PDMS) first soft segments having an average molecular weight of between about 4000 grams per mole to about 7000 grams per mole. The composition further comprises one or more perfluoropolyether second soft segments having an average molecular weight of between about 4000 grams per mole to about 7000 grams per mole. A total content of the one or more first soft segments and the one or more second soft segments is present in an amount of from about 60% by weight to about 85% by weight, based on a total weight percent of the composition. The composition further comprises one or more hard segments present in an amount of from about 15% by weight to about 40% by weight, based on the total weight percent of the composition. The one or more hard segments comprise a combination of one or more cycloalkyl based diisocyanate species and one or more low molecular weight diol or diamine chain extenders. The composition preferably has a high flexibility at an environmental temperature of down to about −100 degrees Celsius, and further has a percent elongation of greater than about 250%, a high tensile strength of greater than 25 MPa (megapascals), and a single low glass transition temperature (Tg) in a range of from about −60 degrees Celsius to about −110 degrees Celsius.

In another embodiment of the disclosure, there is provided a method of synthesizing a segmented copolymer. The method comprises mixing one or more α,ω (alpha, omega) amine or α,ω (alpha, omega) hydroxyl terminated polysiloxane first soft segments having an average molecular weight of between about 2500 grams per mole to about 10,000 grams per mole and one or more diisocyanate species together to form a first reaction product. The method further comprises mixing the first reaction product and one or more low molecular weight diol or diamine chain extenders together in a solvent to form a segmented copolymer. The method further comprises removing the solvent. The segmented copolymer formed has a high flexibility at an environmental temperature of down to about −100 degrees Celsius, and further has a percent elongation of greater than about 250%, a high tensile strength of greater than about 25 MPa (megapascals), and a single low glass transition temperature (Tg) in a range of from about −60 degrees Celsius to about −110 degrees Celsius.

In another embodiment of the disclosure, there is provided a method of synthesizing a segmented copolymer. The method comprises mixing one or more α,ω (alpha, omega) amine or α,ω (alpha, omega) hydroxyl terminated polysiloxane first soft segments having an average molecular weight of between about 2500 grams per mole to about 10,000 grams per mole and one or more diisocyanate species together to form a first reaction product. The method further comprises mixing the first reaction product and one or more perfluoropolyether second soft segments together to form a second reaction product. The method further comprises mixing the second reaction product and one or more low molecular weight diol or diamine chain extenders together in a solvent to form a segmented copolymer. The method further comprises removing the solvent. The segmented copolymer formed has a high flexibility at an environmental temperature of down to about −100 degrees Celsius and further has a percent elongation of greater than about 250%, a high tensile strength of greater than about 25 MPa (megapascals), and a single low glass transition temperature (Tg) in a range of from about −60 degrees Celsius to about −110 degrees Celsius.

In another embodiment of the disclosure, there is provided a segmented copolymer composition. The composition comprises one or more α,ω (alpha, omega) amine or α,ω (alpha, omega) hydroxyl terminated polysiloxane first soft segments having an average molecular weight of between about 2500 grams per mole to about 10,000 grams per mole. The composition further comprises one or more diisocyanate species. The composition further comprises one or more low molecular weight diol or diamine chain extenders having an average molecular weight of less than 400 grams per mole. The composition preferably has a high flexibility at an environmental temperature of down to about −100 degrees Celsius, and further has a percent elongation of greater than about 250%, a high tensile strength of greater than 25 MPa (megapascals), and a single low glass transition temperature (Tg) in a range of from about −60 degrees Celsius to about −110 degrees Celsius. The composition may further comprise one or more additional second soft segments, preferably comprising perfluoropolyether soft segments.

In another embodiment of the disclosure, there is provided a segmented elastomeric copolymer composition. The composition comprises one or more α,ω (alpha, omega) amine or α,ω (alpha, omega) hydroxyl terminated polydimethylsiloxane (PDMS) soft segments having an average molecular weight of between about 4000 grams per mole to about 7000 grams per mole, wherein the one or more PDMS soft segments is present in an amount of from about 60% by weight to about 85% by weight, based on a total weight percent of the composition. The composition further comprises one or more hard segments present in an amount of from about 15% by weight to about 40% by weight, based on the total weight percent of the composition, wherein the one or more hard segments comprise a combination of one or more cycloalkyl based diisocyanate species, and one or more low molecular weight diol or diamine chain extenders having an average molecular weight of less than 400 grams per mole. The composition preferably has a high flexibility at an environmental temperature of down to about −100 degrees Celsius, and further has a percent elongation of greater than about 250%, a high tensile strength of greater than 25 MPa (megapascals), and a single low glass transition temperature (Tg) in a range of from about −60 degrees Celsius to about −110 degrees Celsius.

In another embodiment of the disclosure, there is provided a segmented elastomeric copolymer composition. The composition comprises one or more α,ω (alpha, omega) amine or α,ω (alpha, omega) hydroxyl terminated polydimethylsiloxane (PDMS) first soft segments having an average molecular weight of between about 4000 grams per mole to about 7000 grams per mole. The composition further comprises one or more perfluoropolyether second soft segments having an average molecular weight of between about 4000 grams per mole to about 7000 grams per mole. A total content of the one or more first soft segments and the one or more second soft segments is present in an amount of from about 60% by weight to about 85% by weight, based on a total weight percent of the composition. The composition further comprises one or more hard segments present in an amount of from about 15% by weight to about 40% by weight, based on the total weight percent of the composition. The one or more hard segments comprise a combination of one or more cycloalkyl based diisocyanate species and one or more low molecular weight diol or diamine chain extenders having an average molecular weight of less than 400 grams per mole. The composition preferably has a high flexibility at an environmental temperature of down to about −100 degrees Celsius, and further has a percent elongation of greater than about 250%, a high tensile strength of greater than 25 MPa (megapascals), and a single low glass transition temperature (Tg) in a range of from about −60 degrees Celsius to about −110 degrees Celsius.

In another embodiment of the disclosure, there is provided a method of synthesizing a segmented copolymer. The method comprises mixing one or more α,ω (alpha, omega) amine or α,ω (alpha, omega) hydroxyl terminated polysiloxane first soft segments having an average molecular weight of between about 2500 grams per mole to about 10,000 grams per mole and one or more diisocyanate species together to form a first reaction product. The method further comprises mixing the first reaction product and one or more low molecular weight diol or diamine chain extenders having an average molecular weight of less than 400 grams per mole, together in a solvent to form a segmented copolymer. The method further comprises removing the solvent. The segmented copolymer formed has a high flexibility at an environmental temperature of down to about −100 degrees Celsius, and further has a percent elongation of greater than about 250%, a high tensile strength of greater than about 25 MPa (megapascals), and a single low glass transition temperature (Tg) in a range of from about −60 degrees Celsius to about −110 degrees Celsius.

In another embodiment of the disclosure, there is provided a method of synthesizing a segmented copolymer. The method comprises mixing one or more α,ω (alpha, omega) amine or α,ω (alpha, omega) hydroxyl terminated polysiloxane first soft segments having an average molecular weight of between about 2500 grams per mole to about 10,000 grams per mole and one or more diisocyanate species together to form a first reaction product. The method further comprises mixing the first reaction product and one or more perfluoropolyether second soft segments together to form a second reaction product. The method further comprises mixing the second reaction product and one or more low molecular weight diol or diamine chain extenders having an average molecular weight of less than 400 grams per mole, together in a solvent to form a segmented copolymer. The method further comprises removing the solvent. The segmented copolymer formed has a high flexibility at an environmental temperature of down to about −100 degrees Celsius and further has a percent elongation of greater than about 250%, a high tensile strength of greater than about 25 MPa (megapascals), and a single low glass transition temperature (Tg) in a range of from about −60 degrees Celsius to about −110 degrees Celsius.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 2 is a table showing the compositional data of Examples 1-4 of the disclosure;

FIG. 3 is a table showing the mechanical testing data for Examples 1-4 of the disclosure;

FIG. 4 is a table showing solvent compatibility testing parameters;

FIG. 5 is a table showing mass and volume change following fluid exposure for Examples 1-4 of the disclosure;

DETAILED DESCRIPTION

Figure 1A:
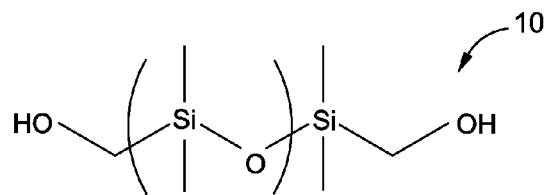
FIG. 1A is an illustration of the chemical structure of soft segment polydimethysiloxane (PDMS) dihydroxyalkyl terminated used in one or more embodiments of the segmented copolymer of the disclosure.

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

There are provided embodiments of segmented copolymer composition and methods of making the compositions. The disclosed embodiments may be used in composite parts for aviation and aerospace aircraft and vehicles, watercraft, rotorcraft, automobiles, trucks, building structures, and other vehicles and craft. Segmented copolymer compositions and methods are disclosed that combine the two properties of high mechanical strength with flexibility over a broad temperature range. The copolymer compositions show a single low and sharp glass transition at low temperature (<−100° C.) and an exceptionally broad rubbery plateau or working temperature (ΔT approximately 250° C.). Chemical compositions of siloxane-urethane/urea segmented copolymers that are able to achieve high tensile strength and elongation values using only PDMS as a soft segment are disclosed. The need to include additional soft segments such as polyether based materials to achieve improved mechanical properties is unnecessary. As a result, the materials produced are able to display glass transition temperatures characteristic of PDMS, broad working temperature ranges, and good mechanical properties.

Polyurethane elastomers may be one-phase systems or two-phase systems. One-phase systems may be homogeneous chemically crosslinked polymers. Two-phase systems may be block copolymers consisting of a hard phase and a soft phase, joined by covalent linkages. The blocks may be referred to as "segments". Due to a difference in the structure and chemical nature of the blocks, the blocks may remain as phase separated domains that do not mix. Polyurethane elastomers may be linear segmented copolymers consisting of one or more soft or flexible segments and one or more hard or rigid segments. As used herein, the term "soft segment" means a relatively flexible (very low hardness or rigidity) component at room temperature, having a low density of urethane groups along the polymer backbone as compared to "hard segments", and that may be derived from isocyanates and diols. The soft segments may be obtained by reacting polyols having molecular weights between 400 grams per mole and 10,000 grams per mole. The soft segment provides the polyurethane with a very low Tg (glass transition temperature). Soft segment concentration is typically the ratio of the mass of polyol chains without terminal hydroxyl groups to the total mass of the polymer, usually expressed as a percentage. The difference, making the total 100%, is hard segment concentration. As used herein, the term "hard segment" means a relatively hard and stiff (high hardness) component at room temperature, having a high density of urethane or urea groups along the polymer backbone as compared to soft segments, and that may be derived from isocyanates, and short diols or diamines, i.e., chain extenders. Neighboring hard segments may be held together by Van der Waals forces and hydrogen bonds, forming domains, which act as physical crosslinks. The hard segments provide the polyurethane with a melting point.

As used herein, the term "glass transition temperature (Tg)" means the temperature above which amorphous regions in an amorphous or semi-crystalline material produce a transition from a hard and brittle to a molten or rubber-like state but does not melt the crystalline regions. The Tg is lower than the melting temperature (Tm) of the crystalline state of the material, if one exists. Preferably, the composition disclosed herein has a single low glass transition temperature (Tg) in a range of from about −60 degrees Celsius to about −110 degrees Celsius.

As used herein, the term "high flexibility" means a high chain flexibility where the glass transition temperature (Tg) is below an application temperature range and which allows high deformation, where "application temperature range" means a working temperature range one is interested in using for a material, such as a material of a component part. For example, working temperature ranges may include temperatures one may expect a material of a component part to experience when the component part is installed in a vehicle, such as an aircraft, automobile, or other structure. For example, an aircraft working temperature range may be −100 degrees Celsius to 150 degrees Celsius, and an automobile working temperature range may be −40 degrees Celsius to 90 degrees Celsius. When the glass transition temperature (Tg) is below the application range for a rubber material, it means that such rubber material will remain flexible when used above the Tg. Preferably, the composition disclosed herein has a high flexibility in an environmental temperature of down to about −100 degrees Celsius.

In an embodiment of the disclosure, there is provided a segmented copolymer composition. The composition comprises one or more α,ω (alpha, omega) amine or α,ω (alpha, omega) hydroxyl terminated polysiloxane first soft segments having an average molecular weight of between about 2500 grams per mole to about 10,000 grams per mole. Preferably, the one or more α,ω (alpha, omega) amine or α,ω (alpha, omega) hydroxyl terminated polysiloxane first soft segments have an average molecular weight of between about 4000 grams per mole to about 7000 grams per mole. More preferably, the one or more α,ω (alpha, omega) amine or α,ω (alpha, omega) hydroxyl terminated polysiloxane first soft segments have an average molecular weight of about 5600 grams per mole. The one or more α,ω (alpha, omega) amine or α,ω (alpha, omega) hydroxyl terminated polysiloxane first soft segments is preferably polydimethylsiloxane (PDMS), poly (diphenyl-co-dimethylsiloxane), poly(methyl-3,3,3-trifluoropropylsiloxane), poly(methyl-n-octylsiloxane), poly(di-n-pentylsiloxane), poly(methyl-n-hexylsiloxane), poly(di-n-propylsiloxane), poly(methyl-n-pentylsiloxane), poly(methyl-n-butylsiloxane), poly(di-n-butylsiloxane), poly(methyl-n-propylsiloxane), poly(methylethylsiloxane), poly(methylhydridosiloxane), and/or polydiethylsiloxane. More preferably, the one or more α,ω (alpha, omega) amine or α,ω (alpha, omega) hydroxyl terminated polysiloxane first soft segments is polydimethylsiloxane (PDMS). FIG. 1A is an illustration of a chemical structure 10 of soft segment polydimethysiloxane (PDMS) dihydroxyalkyl terminated used in one or more of the embodiments of the segmented copolymer of the disclosure. Preferably, the one or more polysiloxane first soft segments is present in an amount of from about 40% by weight to about 95% by weight, based on a total weight percent of the composition. More preferably, the one or more polysiloxane first soft segments is present in an amount of from about 60% by weight to about 85% by weight, based on a total weight percent of the composition. Most preferably, the one or more polysiloxane first soft segments is present in an amount of about 75% by weight, based on a total weight percent of the composition.

Figure 1B:
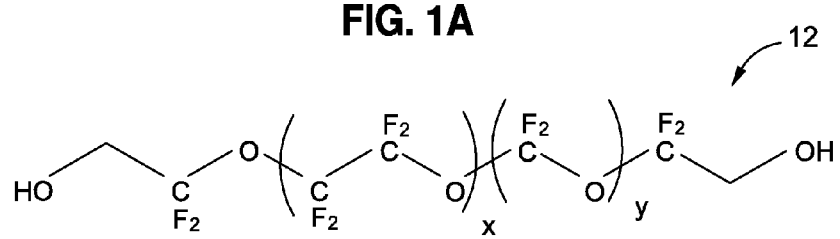
FIG. 1B is an illustration of the chemical structure of soft segment α,ω dihydroxy fluoroether used in one or more of the embodiments of the segmented copolymer of the disclosure.
Figure 1C:
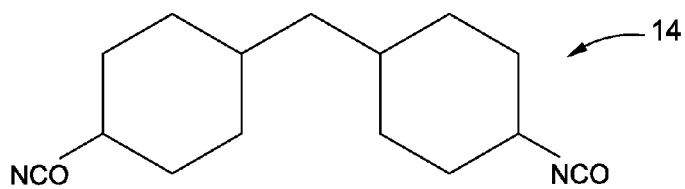
FIG. 1C is an illustration of the chemical structure of diisocyanate 4,4'-methylenebis(cyclohexyl isocyanate) (HMDI) used in one or more of the embodiments of the segmented copolymer of the disclosure.

The composition further comprises one or more diisocyanate species. The one or more diisocyanate species is preferably 4,4'-methylenebis(cyclohexyl isocyanate) (HMDI—Hexamethylene diisocyanate), cycloalkyl based diisocyanates, tolylene-2,4-diisocyante (TDI), 4,4'-methylenebis(phenyl isocyanate) (MDI), and/or isophorone diisocyanate (IDI). More preferably, the one or more diisocyanate species is 4,4'-methylenebis(cyclohexyl isocyanate) (HMDI—Hexamethylene diisocyanate). FIG. 1C is an illustration of a chemical structure 14 of diisocyanate 4,4'-methylenebis(cyclohexyl isocyanate) (HMDI—Hexamethylene diisocyanate) used in one or more of the embodiments of the segmented copolymer of the disclosure.

Figure 1D:
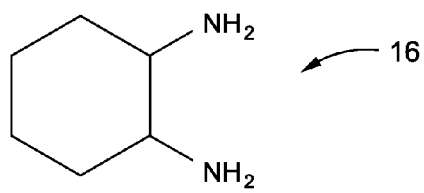
FIG. 1D is an illustration of the chemical structure of chain extender 1,2-diaminocyclohexane (DAC) used in one or more of the embodiments of the segmented copolymer of the disclosure.
Figure 1E:
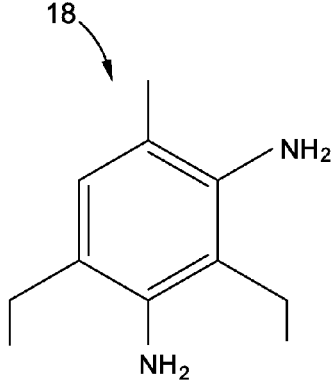
FIGS. 1E-1F are illustrations of the chemical structures of chain extender diethyltoluenediamine (DETDA) used in one or more of the embodiments of the segmented copolymer of the disclosure.
Figure 1F:
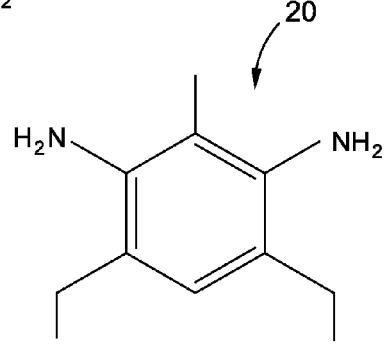

The composition further comprises one or more low molecular weight diol or diamine chain extenders, where "low molecular weight" means the diol chain extender or the diamine chain extender each preferably having an average molecular weight of less than 400 grams per mole (g/mol); and more preferably, each having an average molecular weight of between about 50 grams per mole and about 399 grams per mole; and most preferably, each having an average molecular weight of between about 100 grams per mole and about 250 grams per mole. The one or more low molecular weight diol or diamine chain extenders is/are preferably low molecular weight linear diamines, cycloalkyl diamines, cycloaliphatic diamines, aromatic diamines, 1,2-diaminocyclohexane (DAC), 1,3-diaminocyclohexane, 1,4-diaminocyclohexane, diethyltoluenediamine (DETDA), isophorone diamine(5-amino-1,3,3-trimethyl cyclohexanemethanamine), bis-(p-aminocyclohexyl)methane, 2,2-bis(4-aminocyclohexyl)propane, 4-methyl-1,3-cyclohexane diamine, 2,4-diethyl-6-methylcyclohexane-1,3 diamine, and/or a mixture of two or more thereof. According to the CAS (Chemical Abstracts Service) registry, the molecular weights in grams per mole for the following low molecular weight chain extenders include: 1,2-diaminocyclohexane (DAC) has a molecular weight of 114.19 g/mol; 1,3-diaminocyclohexane has a molecular weight of 114.19 g/mol; 1,4-diaminocyclohexane has a molecular weight of 114.19 g/mol; diethyltoluenediamine (DETDA) has a molecular weight of 178.28 g/mol; isophorone diamine(5-amino-1,3,3-trimethyl cyclohexanemethanamine) has a molecular weight of 170.25 g/mol; bis-(p-aminocyclohexyl)methane has a molecular weight of 210.37 g/mol; 2,2-bis(4-aminocyclohexyl)propane has a molecular weight of 238.42 g/mol; 4-methyl-1,3-cyclohexane diamine has a molecular weight of 128.25 g/mol; and 2,4-diethyl-6-methylcyclohexane-1,3 diamine has a molecular weight of 179 g/mol. More preferably, the one or more low molecular weight diol or diamine chain extenders is 1,2-diaminocyclohexane (DAC) or 1,2-diaminocyclohexane (DAC) plus diethyltoluenediamine (DETDA), such as ETHACURE 100 obtained from Albermarle Corporation of Baton Rouge, La. (ETHACURE is a registered trademark of Albermarle Corporation of Baton Rouge, La.). FIG. 1D is an illustration of the chemical structure of chain extender 1,2-diaminocyclohexane (DAC) used in one or more of the embodiments of the segmented copolymer of the disclosure. FIG. 1E and FIG. 1F are illustrations of chemical structures 18, 20 of chain extender diethyltoluenediamine (DETDA) (ETHACURE 100) used in one or more of the embodiments of the segmented copolymer of the disclosure. The components are added at a ratio such that the equivalents of isocyanate species are stoichiometrically equal to the total alcohol and amine species in the composition. Preferably, one or more hard segments comprised of a combination of one or more diisocyanate species and one or more low molecular weight diol or diamine chain extenders, (preferably, the one or more low molecular weight diol or diamine chain extenders each have an average molecular weight of less than 400 grams per mole, and more preferably, each have an average molecular weight of between about 50 grams per mole and about 399 grams per mole, and most preferably, each have an average molecular weight of between about 100 grams per mole and about 250 grams per mole), is present in an amount of from about 5% by weight to about 60% by weight, based on a total weight percent of the composition. More preferably, the one or more hard segments comprised of a combination of one or more diisocyanate species and one or more low molecular weight diol or diamine chain extenders, is present in an amount of from about 15% by weight to about 40% by weight, based on a total weight percent of the composition. Most preferably, the one or more hard segments comprised of a combination of one or more diisocyanate species and one or more low molecular weight diol or diamine chain extenders is present in an amount of about 25% by weight, based on a total weight percent of the composition. The chain extender is preferably composed of a mixture of low molecular weight cycloalkyl diamines and aromatic diamines. This serves to reduce the reaction rate and increase of the molecular weight of the system over time leading to a slower build in viscosity of the system.

The combination of HMDI as diisocyanate and cyclohexyl groups such as diaminocyclohexane combine two chemical species that share the common cyclohexyl structure. Such a hard segment has a very high density of cycloalkyl groups which may be more compatible with the PDMS soft segment than similar aromatic or alkyl chain extenders. This can reduce phase separation at the interface between soft and hard segments creating more of a gradient interface rather than a sharp transition and allowing greater stresses in the material to display greater tensile strength and elongation.

Another disclosed embodiment is the use of siloxane based diamine or diol curatives or chain extenders to complete the hard segments. This can reduce the solubility parameter contrast between hard and soft segments to an even greater extent by matching the chemical structure of the soft segment more precisely.

In another embodiment, the composition may further comprise one or more second soft segments. The one or more second soft segments is preferably perfluoropolyether, α,ω (alpha, omega) dihydroxy terminated fluoroether, α,ω (alpha, omega) hydroxyl terminated poly(perfluoromethylisopropyl ether), polythiodifluoromethylene, polybutadiene, polydioxypropylphosphazene, polydioxyethylphosphazene, polyoxytrimethylene, polydioxymethylphosphazene, polyisoprene, and/or polyisobutylene. More preferably, the one or more second soft segments is α,ω hydroxyl terminated poly(perfluoromethylisopropyl ether). FIG. 1B is an illustration of a chemical structure 12 of a soft segment α,ω (alpha, omega) dihydroxy fluoroether FOMBLIN ZDol 4000 obtained from Solvay Solexis, Inc. of Thorofare, N.J. (FOMBLIN is a registered trademark of Solvay Solexis, Inc. of Thorofare, N.J.) that may be used in one or more of the embodiments of the segmented copolymer of the disclosure. FOMBLIN ZDol 4000 is a dihydroxy derivative of perfluoropolyxoyalkane and has a molecular weight of 3900-4100. Preferably, the one or more second soft segments or soft segment components have an average molecular weight of between about 2500 grams per mole to about 10,000 grams per mole. More preferably, the one or more second soft segments or soft segment components have an average molecular weight of between about 4000 grams per mole to about 7000 grams per mole. Most preferably, the one or more second soft segments or soft segment components have an average molecular weight of between about 4000 grams per mole. Preferably, the one or more second soft segments is present in an amount of from about 5% by weight to about 50% by weight, based on a total weight percent of the soft segment content. More preferably, the one or more second soft segments is present in an amount of from about 20% by weight to about 50% by weight, based on a total weight percent of the soft segment content. Most preferably, the one or more second soft segments is present in an amount of about 40% by weight, based on a total weight percent of the soft segment content.

Thus, in one embodiment the soft segment may consist of a first soft segment such as polydimethylsiloxane (PDMS) and a second soft segment such as a dihydroxy terminated fluoroether or perfluoropolyether. The perfluoropolyether materials also have exceptionally low glass transition temperatures similar to polydimethylsiloxane (PDMS) in order to maintain an overall low Tg for the copolymer material. Preferably, the one or more soft segments have a single low glass transition temperature (Tg) in a range of from about −60 degrees Celsius to about −110 degrees Celsius. More preferably, polydimethylsiloxane (PDMS) has a glass transition temperature (Tg) of −110 degrees Celsius, and perfluoropolyether has a glass transition temperature (Tg) of −100 degrees Celsius. While the perfluoropolyether soft segment may be added to the solution sequentially following growth of the siloxane soft segments, its function serves to improve chemical resistance of the material. The function of the second soft segment such as the perfluoropolyether soft segment is not intended to serve as an interfacial barrier between the polydimethylsiloxane (PDMS) soft segments and the urea hard segments. This is due to the fact that polyfluorocarbons possess the same low solubility parameters as polysiloxanes of approximately 12-17 $(J/cm^3)^{1/2}$ (Joules per cubic centimeter) which is in strong contrast to that of polyurea segments with a solubility parameter of 45 $(J/cm^3)^{1/2}$. The low solubility parameter of the polyfluoroether segments differs from that of a second soft segment such as poly(propylene oxide) which has an intermediate solubility parameter of 23.5 $(J/cm^3)^{1/2}$ helping to create a gradient interface with respect to solubility parameters of the blocks.

The compositions of the disclosed embodiments preferably have a high flexibility at an environmental temperature of down to about −100 degrees Celsius. Preferably, the compositions of the disclosed embodiments further have a percent elongation of greater than about 250%, a high tensile strength of greater than 25 MPa (megapascals), and a single low glass transition temperature (Tg) in a range of from about −60 degrees Celsius to about −110 degrees Celsius. Preferably, the compositions of the disclosed embodiments have a temperature insensitive modulus between a range of from about −100 degrees Celsius to about 150 degrees Celsius.

In another embodiment of the disclosure, there is provided a segmented elastomeric copolymer composition. The composition comprises one or more α,ω (alpha, omega) amine or α,ω (alpha, omega) hydroxyl terminated polydimethylsiloxane (PDMS) soft segments having an average molecular weight of between about 4000 grams per mole to about 7000 grams per mole, wherein the one or more PDMS soft segments is present in an amount of from about 60% by weight to about 85% by weight, based on a total weight percent of the composition. The composition further comprises one or more hard segments present in an amount of from about 15% by weight to about 40% by weight, based on the total weight percent of the composition, wherein the one or more hard segments comprise a combination one or more cycloalkyl based diisocyanate species and one or more low molecular weight diol or diamine chain extenders. Preferably, the one or more low molecular weight diol or diamine chain extenders each have an average molecular weight of less than 400 grams per mole, and more preferably, each have an average molecular weight of between about 50 grams per mole and about 399 grams per mole, and most preferably, each have an average molecular weight of between about 100 grams per mole and about 250 grams per mole. The components are added at a ratio such that the equivalents of diisocyanate species are stoichiometrically equal to the total alcohol and amine species in the composition. The composition preferably has a high flexibility at an environmental temperature of down to about −100 degrees Celsius, and further has a percent elongation of greater than about 250%, a high tensile strength of greater than 25 MPa (megapascals), and a single low glass transition temperature (Tg) in a range of from about −60 degrees Celsius to about −110 degrees Celsius.

In another embodiment of the disclosure, there is provided a segmented elastomeric copolymer composition. The composition comprises one or more α,ω (alpha, omega) amine or α,ω (alpha, omega) hydroxyl terminated polydimethylsiloxane (PDMS) first soft segments having an average molecular weight of between about 4000 grams per mole to about 7000 grams per mole. The composition further comprises one or more perfluoropolyether second soft segments having an average molecular weight of between about 4000 grams per mole to about 7000 grams per mole. A total content of the one or more first soft segments and the one or more second soft segments is present in an amount of from about 60% by weight to about 85% by weight, based on a total weight percent of the composition. The composition further comprises one or more hard segments present in an amount of from about 15% by weight to about 40% by weight, based on the total weight percent of the composition. The one or more hard segments comprise a combination of one or more cycloalkyl based diisocyanate species and one or more low molecular weight diol or diamine chain extenders. Preferably, the one or more low molecular weight diol or diamine chain extenders each have an average molecular weight of less than 400 grams per mole, and more preferably, each have an average molecular weight of between about 50 grams per mole and about 399 grams per mole, and most preferably, each have an average molecular weight of between about 100 grams per mole and about 250 grams per mole. The components are added at a ratio such that the equivalents of diisocyanate species are stoichiometrically equal to the total alcohol and amine species in the composition. The composition preferably has a high flexibility at an environmental temperature of down to about −100 degrees Celsius, and further has a percent elongation of greater than about 250%, a high tensile strength of greater than 25 MPa (megapascals), and a single low glass transition temperature (Tg) in a range of from about −60 degrees Celsius to about −110 degrees Celsius.

Figure 9:
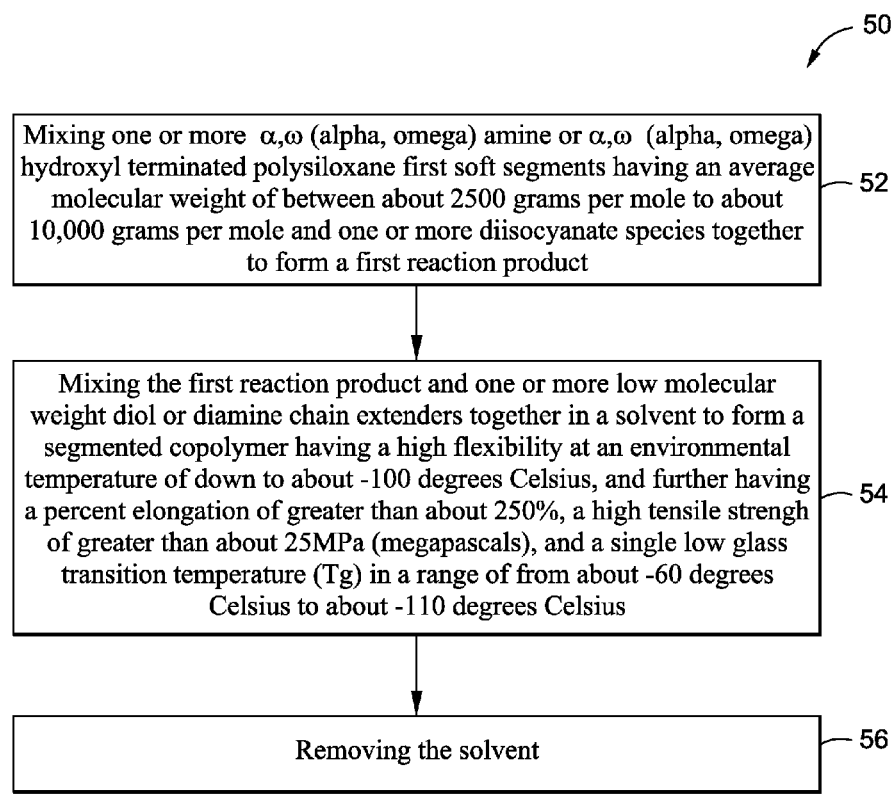
FIG. 9 is an illustration of a flow diagram of an embodiment of a method of making a segmented copolymer of the disclosure; and, FIG. 10 is an illustration of a flow diagram of another embodiment of a method of making a segmented copolymer of the disclosure.

In another embodiment of the disclosure, there is provided a method of synthesizing a segmented copolymer. FIG. 9 is an illustration of a flow diagram of an embodiment of a method 50 of making one of the embodiments of the segmented copolymers of the disclosure. The method 50 comprises step 52 of mixing one or more α,ω (alpha, omega) amine or α,ω (alpha, omega) hydroxyl terminated polysiloxane first soft segments preferably having an average molecular weight of between about 2500 grams per mole to about 10,000 grams per mole and one or more diisocyanate species together to form a first reaction product. More preferably, the one or more α,ω (alpha, omega) amine or α,ω (alpha, omega) hydroxyl terminated polysiloxane first soft segments have an average molecular weight of between about 4000 grams per mole to about 7000 grams per mole. Most preferably, the one or more α,ω (alpha, omega) amine or α,ω (alpha, omega) hydroxyl terminated polysiloxane first soft segments have an average molecular weight of about 5600 grams per mole. The one or more α,ω (alpha, omega) amine or α,ω (alpha, omega) hydroxyl terminated polysiloxane first soft segments is preferably polydimethylsiloxane (PDMS), poly(diphenyl-co-dimethylsiloxane), poly(methyl-3,3,3-trifluoropropylsiloxane), poly(methyl-n-octylsiloxane), poly(di-n-pentylsiloxane), poly(methyl-n-hexylsiloxane), poly(di-n-propylsiloxane), poly(methyl-n-pentylsiloxane), poly(methyl-n-butylsiloxane), poly(di-n-butylsiloxane), poly(methyl-n-propylsiloxane), poly(methylethylsiloxane), poly(methylhydridosiloxane), and/or polydiethylsiloxane. More preferably, the one or more α,ω (alpha, omega) amine or α,ω (alpha, omega) hydroxyl terminated polysiloxane first soft segments is polydimethylsiloxane (PDMS). Preferably, the one or more polysiloxane first soft segments is present in an amount of from about 40% by weight to about 95% by weight, based on a total weight percent of the composition. More preferably, the one or more polysiloxane first soft segments is present in an amount of from about 60% by weight to about 85% by weight, based on a total weight percent of the composition. Most preferably, the one or more polysiloxane first soft segments is present in an amount of about 75% by weight, based on a total weight percent of the composition.

The one or more diisocyanate species is preferably 4,4'-methylenebis(cyclohexyl isocyanate) (HMDI), cycloalkyl based diisocyanates, tolylene-2,4-diisocyante (TDI), 4,4'-methylenebis(phenyl isocyanate) (MDI), and/or isophorone diisocyanate (IDI). More preferably, the one or more diisocyanate species is 4,4'-methylenebis(cyclohexyl isocyanate) (HMDI).

The method further comprises step 54 of mixing the first reaction product and one or more low molecular weight diol or diamine chain extenders together in a solvent to form a segmented copolymer. The one or more low molecular weight diol or diamine chain extenders preferably each have an average molecular weight of less than 400 grams per mole, and more preferably, each have an average molecular weight of between about 50 grams per mole and about 399 grams per mole, and most preferably, each have an average molecular weight of between about 100 grams per mole and about 250 grams per mole. The one or more low molecular weight diol or diamine chain extenders is preferably low molecular weight linear diamines, cycloalkyl diamines, cycloaliphatic diamines, aromatic diamines, 1,2-diaminocyclohexane (DAC), 1,3-diaminocyclohexane, 1,4-diaminocyclohexane, diethyltoluenediamine (DETDA) (ETHACURE 100), isophorone diamine(5-amino-1,3,3-trimethyl cyclohexanemethanamine), bis-(p-aminocyclohexyl)methane, 2,2-bis (4-aminocyclohexyl)propane, 4-methyl-1,3-cyclohexane diamine, 2,4-diethyl-6-methylcyclohexane-1,3 diamine, or a mixture of two or more thereof. More preferably, the one or more low molecular weight diol or diamine chain extenders is 1,2-diaminocyclohexane (DAC). The components are added at a ratio such that the equivalents of diisocyanate species are stoichiometrically equal to the total alcohol and amine species in the composition. Preferably, one or more hard segments comprised of a combination of one or more diisocyanate species and one or more low molecular weight diol or diamine chain extenders, (preferably, the one or more low molecular weight diol or diamine chain extenders each have an average molecular weight of less than 400 grams per mole, and more preferably, each have an average molecular weight of between about 50 grams per mole and about 399 grams per mole, and most preferably, each have an average molecular weight of between about 100 grams per mole and about 250 grams per mole), is present in an amount of from about 5% by weight to about 60% by weight, based on a total weight percent of the composition. More preferably, the one or more hard segments comprised of a combination of one or more diisocyanate species and one or more low molecular weight diol or diamine chain extenders is present in an amount of from about 15% by weight to about 40% by weight, based on a total weight percent of the composition. Most preferably, the one or more hard segments comprised of a combination of one or more diisocyanate species and one or more low molecular weight diol or diamine chain extenders is present in an amount of about 25% by weight, based on a total weight percent of the composition.

Preferably, the solvent is a secondary or tertiary alcohol comprised of isopropanol, tert-butanol, 2-butanol, 3-methyl-3-pentanol, 2-methyl-2-pentanol, t-amyl methyl ether, 2,3 dimethyl-2-butanol, 3-methyl-1,3-butanediol, 2-3 dimethyl-3-pentanol, 3-ethyl-3-pentanol, 2,4-dimethyl-2-pentanol, 2-methyl-2-hexanol, or another suitable secondary or tertiary alcohol. More preferably, the solvent is isopropanol. Preferably, the segmented copolymer formed has a high flexibility at an environmental temperature of down to about −100 degrees Celsius, and further has a percent elongation of greater than about 250%, a high tensile strength of greater than about 25 MPa (megapascals), and a single low glass transition temperature (Tg) in a range of from about −60 degrees Celsius to about −110 degrees Celsius. Preferably, the segmented copolymer has a temperature insensitive modulus between a range of from about −100 degrees Celsius to about 150 degrees Celsius.

The method may further comprise step 56 of removing the solvent. In one embodiment of the method, the solvent is not removed and the segmented copolymer remains in solution for subsequent use. This can be applied to a surface at a later time convenient for a user. In an exemplary embodiment, the segmented copolymer may be applied to surfaces via spray coating directly from solution. In another embodiment of the method, the first reaction product and the mixture of chain extenders are prepared separately and are able to be stored long term prior to the addition of a solvent and combination to form the final product.

Figure 10:
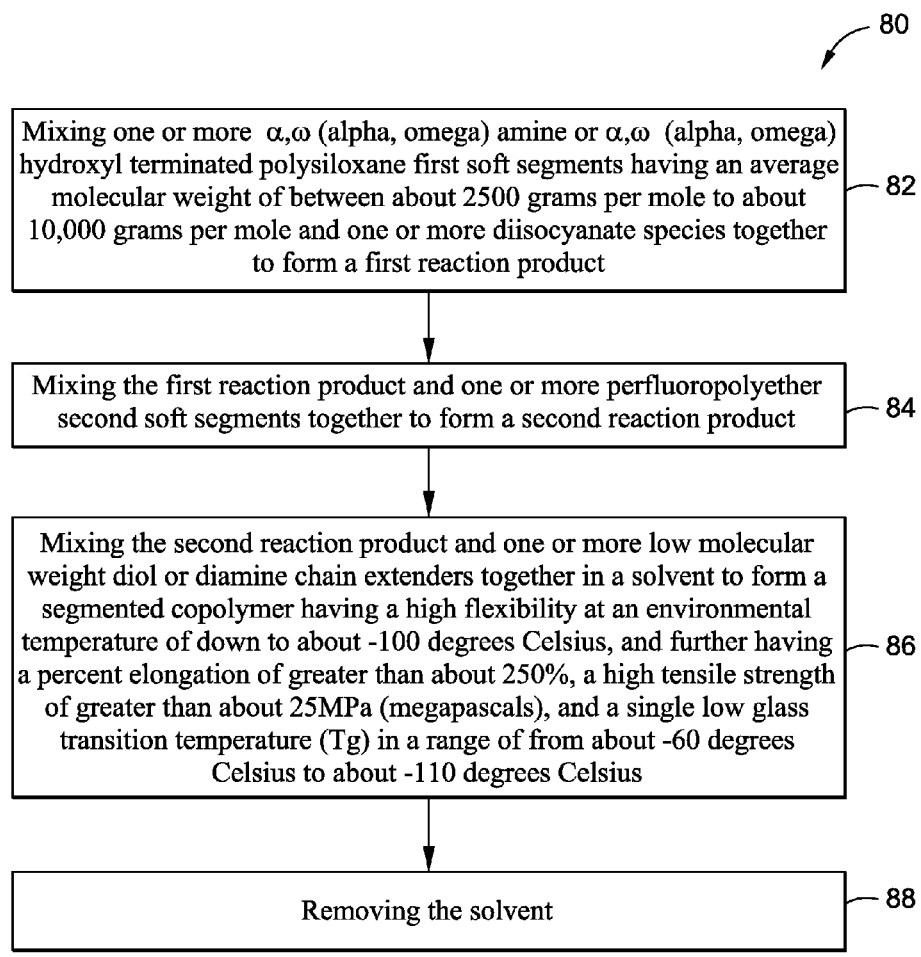

In another embodiment of the disclosure, there is provided a method of synthesizing a segmented copolymer. FIG. 10 is an illustration of a flow diagram of another embodiment of a method 80 of making another one of the embodiments of the segmented copolymers of the disclosure. The method comprises step 82 of mixing one or more α,ω (alpha, omega) amine or α,ω (alpha, omega) hydroxyl terminated polysiloxane first soft segments preferably having an average molecular weight of between about 2500 grams per mole to about 10,000 grams per mole and one or more diisocyanate species together to form a first reaction product. More preferably, the one or more α,ω (alpha, omega) amine or α,ω (alpha, omega) hydroxyl terminated polysiloxane first soft segments have an average molecular weight of between about 4000 grams per mole to about 7000 grams per mole. Most preferably, the one or more α,ω (alpha, omega) amine or α,ω (alpha, omega) hydroxyl terminated polysiloxane first soft segments have an average molecular weight of between about 5600 grams per mole. The one or more α,ω (alpha, omega) amine or α,ω (alpha, omega) hydroxyl terminated polysiloxane first soft segments is preferably polydimethylsiloxane, poly(diphenyl-co-dimethylsiloxane), poly(methyl-3,3,3-trifluoropropylsiloxane), poly(methyl-n-octylsiloxane), poly(di-n-pentylsiloxane), poly(methyl-n-hexylsiloxane), poly(di-n-propylsiloxane), poly(methyl-n-pentylsiloxane), poly(methyl-n-butylsiloxane), poly(di-n-butylsiloxane), poly(methyl-n-propylsiloxane), poly(methylethylsiloxane), poly(methylhydridosiloxane), or polydiethylsiloxane. More preferably, the one or more α,ω (alpha, omega) amine or α,ω (alpha, omega) hydroxyl terminated polysiloxane first soft segments is polydimethylsiloxane. Preferably, the one or more polysiloxane first soft segments is present in an amount of from about 40% by weight to about 95% by weight, based on a total weight percent of the composition. More preferably, the one or more polysiloxane first soft segments is present in an amount of from about 60% by weight to about 85% by weight, based on a total weight percent of the composition. Most preferably, the one or more polysiloxane first soft segments is present in an amount of about 75% by weight, based on a total weight percent of the composition.

The one or more diisocyanate species is preferably 4,4'-methylenebis(cyclohexyl isocyanate) (HMDI), cycloalkyl based diisocyanates, tolylene-2,4-diisocyante (TDI), 4,4'-methylenebis(phenyl isocyanate) (MDI), or isophorone diisocyanate (IDI). More preferably, the one or more diisocyanate species consists of 4,4'-methylenebis(cyclohexyl isocyanate) (HMDI).

The method further comprises step 84 of mixing the first reaction product and one or more perfluoropolyether second soft segments together to form a second reaction product. Preferably, the one or more perfluoropolyether second soft segments is α,ω (alpha, omega) dihydroxy terminated fluoroether, or α,ω (alpha, omega) hydroxyl terminated poly(perfluoromethylisopropyl ether). More preferably, the one or more perfluoropolyether second soft segments is α,ω hydroxyl terminated poly(perfluoromethylisopropyl ether). Preferably, the one or more perfluoropolyether second soft segments have an average molecular weight of between about 2500 grams per mole to about 10,000 grams per mole. More preferably, the one or more perfluoropolyether second soft segments have an average molecular weight of between about 4000 grams per mole to about 7000 grams per mole. Most preferably, the one or more perfluoropolyether second soft segments have an average molecular weight of between about 4000 grams per mole. Preferably, the one or more perfluoropolyether second soft segments is present in an amount of from about 5% by weight to about 50% by weight, based on a total weight percent of the soft segment content. More preferably, the one or more perfluoropolyether second soft segments is present in an amount of from about 20% by weight to about 50% by weight, based on a total weight percent of the soft segment content. Most preferably, the one or more perfluoropolyether second soft segments is present in an amount of about 40% by weight, based on a total weight percent of the soft segment content.

The method further comprises step 86 of mixing the second reaction product and one or more low molecular weight diol or diamine chain extenders together in a solvent to form a segmented copolymer. The one or more low molecular weight diol or diamine chain extenders preferably each have an average molecular weight of less than 400 grams per mole, and more preferably, each have an average molecular weight of between about 50 grams per mole and about 399 grams per mole, and most preferably, each have an average molecular weight of between about 100 grams per mole and about 250 grams per mole. The one or more low molecular weight diol or diamine chain extenders is preferably linear diamines, cycloalkyl diamines, cycloaliphatic diamines, aromatic diamines, 1,2-diaminocyclohexane (DAC), 1,3-diaminocyclohexane, 1,4-diaminocyclohexane, diethyltoluenediamine (DETDA) (ETHACURE 100), isophorone diamine(5-amino-1,3,3-trimethyl cyclohexanemethanamine), bis-(p-aminocyclohexyl)methane, 2,2-bis(4-aminocyclohexyl)propane, 4-methyl-1,3-cyclohexane diamine, 2,4-diethyl-6-methylcyclohexane-1,3 diamine, or a mixture of two or more thereof. More preferably, the one or more low molecular weight diol or diamine chain extenders consist of 1,2-diaminocyclohexane (DAC). The components are added at a ratio such that the equivalents of diisocyanate species are stoichiometrically equal to the total alcohol and amine species in the composition. Preferably, one or more hard segments comprised of a combination of one or more diisocyanate species and one or more low molecular weight diol or diamine chain extenders, (preferably each have an average molecular weight of less than 400 grams per mole, and more preferably, each have an average molecular weight of between about 50 grams per mole and about 399 grams per mole, and most preferably, each have an average molecular weight of between about 100 grams per mole and about 250 grams per mole), is present in an amount of from about 5% by weight to about 60% by weight, based on a total weight percent of the composition. More preferably, the one or more hard segments comprised of a combination of one or more diisocyanate species and one or more low molecular weight diol or diamine chain extenders is present in an amount of from about 15% by weight to about 40% by weight, based on a total weight percent of the composition. Most preferably, the one or more hard segments comprised of a combination of one or more diisocyanate species and one or more low molecular weight diol or diamine chain is present in an amount of about 25% by weight, based on a total weight percent of the composition.

Preferably, the solvent is a secondary or tertiary alcohol of isopropanol, tert-butanol, 2-butanol, 3-methyl-3-pentanol, 2-methyl-2-pentanol, t-amyl methyl ether, 2,3 dimethyl-2-butanol, 3-methyl-1,3-butanediol, 2-3 dimethyl-3-pentanol, 3-ethyl-3-pentanol, 2,4-dimethyl-2-pentanol, 2-methyl-2-hexanol, or another suitable secondary or tertiary alcohol. More preferably, the solvent is isopropanol. Preferably, the segmented copolymer formed has a high flexibility at an environmental temperature of down to about −100 degrees Celsius, and further has a percent elongation of greater than about 250%, a high tensile strength of greater than about 25 MPa (megapascals), and a single low glass transition temperature (Tg) in a range of from about −60 degrees Celsius to about −110 degrees Celsius. Preferably, the segmented copolymer has a temperature insensitive modulus between a range of from about −100 degrees Celsius to about 150 degrees Celsius.

The method may further comprise step 88 of removing the solvent. In one embodiment of the method, the solvent is not removed and the segmented copolymer remains in solution for subsequent use. This can be applied to a surface at a later time convenient for a user. In an exemplary embodiment, the segmented copolymer may be applied to surfaces via spray coating directly from solution. In another embodiment of the method, the first reaction product and the mixture of chain extenders are prepared separately and are able to be stored long term prior to the addition of a solvent and combination to form the final product.

EXAMPLES

Various embodiments of the segmented copolymer compositions discussed above were prepared and various mechanical tests were performed. Compositions were prepared for Examples 1-6. FIG. 2 is a table showing the compositional data of Examples 1-4. FIG. 3 is a table showing the mechanical testing data for Examples 1-4. Experiments were conducted (Examples 5 and 6) with and without additional intermediate polyether segments in order to demonstrate the need to remove polyether segments to achieve low temperature (<50° C.) flexibility.

Materials and Methods.

To prepare the sample compositions, the following materials were obtained: (1) α,ω bishydroxyl terminated polydimethylsiloxane (PDMS) soft segment having an average molecular weight (Mn) of 5600 g/mol (grams per mole) was obtained from Sigma-Aldrich of St. Louis, Mo.; (2) 4,4'-methylenebis(cyclohexyl isocyanate) (HMDI) obtained from Sigma-Aldrich of St. Louis, Mo.; (3) 1,2-diaminocyclohexane (DAC) was obtained from Sigma-Aldrich of St. Louis, Mo.; (4) ETHACURE 100 was obtained from Albermarle Corporation of Baton Rouge, La.; (5) FOMBLIN Zdol 4000 fluoroether soft segment having an average molecular weight (Mn) of 4000 g/mol was obtained from Solvay Solexis, Inc. of Thorofare, N.J.; and (6) isopropanol solvent was obtained from Mallinckrodt Baker of Phillipsburg, N.J., and the isopropanol was dried over activated 4 Å (Angstrom) molecular sieves. In addition, triethylamine was obtained from Sigma-Aldrich of St. Louis, Mo.; was dried over $CaH_2$ (calcium hydride) also obtained from Sigma-Aldrich of St. Louis, Mo., and was distilled; and Jeffamine D-2000, an α,ω diamino poly(propylene oxide) having an average molecular weight (Mn) was obtained from Huntsman of Woodland, Tex.

Tensile testing was performed on an INSTRON 5565 tensile testing machine obtained from Instron of Canton, Mass. (INSTRON is a registered trademark owned by Illinois Tool Works Inc. of Glenview, Ill.) using a crosshead speed of 2.5 mm/min (millimeters per minute). Dynamic mechanical analysis was performed on a DMA Q800 dynamic mechanical analysis machine obtained from TA Instruments of New Castle, Del. Scans were run at a frequency of 1 Hz (Hertz) with a temperature ramp rate of 3° C./min (degrees Celsius per minute).

Films were cast from shallow PTFE (polytetrafluoroethylene) molds of either 2 inches by 2 inches or 3 inches by 3 inches in area. Viscous polymer solution was poured into the shallow tray and covered to allow the film to flow and achieve a uniform thickness for mechanical testing samples. The cover was then removed and the solvent allowed to evaporate. Films were then placed in a vacuum chamber to ensure removal of residual solvent.

Example 1

In Example 1, PDMS (5.0 g (grams), 0.893 mmoles (millimoles)) and HMDI (1.17 g, 4.46 mmoles) were charged to a vial and stirred with heating at 90° C. until the mixture turned clear (typically 1-2 (one to two) hours) and then was heated for 3 (three) hours more at 90° C. The mixture was then cooled to ambient temperature. Isopropanol (8 g) was added to the mixture and stirred until the mixture was homogeneous. In a separate vial, DAC was measured (407 mg (milligrams), 3.57 mmoles) and dissolved in isopropanol (2 g). These two solutions were combined and vigorously mixed. After approximately 5 (five) minutes, the solution was poured into a 3 inch by 3 inch PTFE mold and covered overnight. The isopropanol was then removed through evaporation to produce a film (approximately 0.5 mm (millimeters) thick) for use in mechanical testing.

Example 2

In Example 2, PDMS (5.0 g, 0.893 mmoles) and HMDI (1.17 g, 4.46 mmoles) were charged to a vial and stirred with heating at 90° C. until the mixture turned clear (typically 1-2 (one to two) hours) and then was heated for 3 (three) hours more at 90° C. The mixture was then cooled to ambient temperature. Isopropanol (6 g) was added to the mixture and stirred until the mixture was homogeneous. In a separate vial, DAC (305 mg, 2.68 mmoles) and ETHACURE 100 (159 mg, 0.893 mmoles) were dissolved in isopropanol (2 g). These two solutions were combined and vigorously mixed. After approximately 5 (five) minutes, the solution was poured into a 3 inch by 3 inch PTFE mold and covered overnight. The isopropanol was then removed through evaporation to produce a film (approximately 0.5 mm thick) for use in mechanical testing.

Example 3

In Example 3, PDMS (3.5 g, 0.625 mmoles) and HMDI (1.36 g, 5.2 mmoles) were charged to a vial and stirred. An aliquot of triethylamine (approximately 10 uL (microliters)) was added via capillary tube and the solution was stirred with heating at 90° C. for 3 (three) hours. α,ω dihydroxy fluoroether (FOMBLIN ZDol 4000) was then added (1.67 g, 0.417 mmoles) and the mixture stirred for 3 (three) more hours at 90° C. The mixture had a turbid appearance upon addition of the fluoroether. The mixture was then cooled to ambient temperature. Isopropanol (8 g) was added to the mixture and stirred until the mixture was homogeneous. In a separate vial, DAC was measured (474 mg, 4.16 mmoles) and dissolved in isopropanol (2 g). These two solutions were combined and vigorously mixed. After approximately 5 (five) minutes, the solution was poured into a 3 inch by 3 inch PTFE mold and covered overnight. The isopropanol was then removed through evaporation to produce a film (approximately 0.5 mm thick) for use in mechanical testing.

Example 4

In Example 4, PDMS (3.5 g, 0.625 mmoles) and HMDI (1.36 g, 5.2 mmoles) were charged to a vial and stirred. An aliquot of triethylamine (approximately 10 uL) was added via capillary tube and the solution was stirred with heating at 90° C. for 3 (three) hours. α,ω dihydroxy fluoroether (FOMBLIN ZDol 4000) was then added (1.67 g, 0.417 mmoles) and the mixture stirred for 3 (three) more hours at 90° C. The mixture was then cooled to ambient temperature. Isopropanol (6 g) was added to the mixture and stirred until the mixture was homogeneous. In a separate vial, DAC (356 mg, 3.12 mmoles) and ETHACURE 100 (185 mg, 1.04 mmoles) were dissolved in isopropanol (2 g). These two solutions were combined and vigorously mixed. After a approximately 5 (five) minutes, the solution was poured into a 3 inch by 3 inch PTFE mold and covered overnight. The isopropanol was then removed through evaporation to produce a film (approximately 0.5 mm thick) for use in mechanical testing.

Example 5

In Example 5, PDMS (3.5 g, 0.625 mmoles) and HMDI (819 mg, 3.13 mmoles) were charged to a vial and stirred. An aliquot of triethylamine (approximately 10 uL) was added via capillary tube and the solution was stirred with heating at 90° C. until the mixture turned clear (typically 1 to 2 hours) and then for 3 (three) hours more at 90° C. The mixture was then cooled to ambient temperature. Isopropanol (6 g) was added to the mixture and stirred until the mixture was homogeneous. α,ω diamino polypropylene oxide (Jeffamine D-2000) was then added (1.25 g, 0.625 mmoles) dropwise to the solution while stirring vigorously and the mixture left to stand for 30 (thirty) minutes at room temperature. In a separate vial, DAC (214 mg, 1.88 mmoles) was dissolved in isopropanol (2 g). These two solutions were combined and vigorously mixed. The solution was promptly poured into a 3 inch by 3 inch PTFE mold and covered overnight. The isopropanol was then removed through evaporation to produce a film (approximately 0.5 mm thick) for use in mechanical testing.

Example 6

In Example 6, PDMS (3.5 g, 0.625 mmoles) and HMDI (1.31 g, 5.0 mmoles) were charged to a vial and stirred. An aliquot of triethylamine (approximately 10 uL) was added via capillary tube and the solution was stirred with heating at 90° C. until the mixture turned clear (typically 1 to 2 hours) and then for 3 (three) hours more at 90° C. The mixture was then cooled to ambient temperature. Isopropanol (6 g) was added to the mixture and stirred until the mixture was homogeneous. α,ω diamino polypropylene oxide (Jeffamine D-2000) was then added (2.50 g, 1.25 mmoles) dropwise to the solution while stirring vigorously and the mixture left to stand for 30 (thirty) minutes at room temperature. In a separate vial, DAC (355 mg, 3.12 mmoles) was dissolved in isopropanol (2 g). These two solutions were combined and vigorously mixed. The solution was promptly poured into a 3 inch by 3 inch PTFE mold and covered overnight. The isopropanol was then removed through evaporation to produce a film (approximately 0.5 mm thick) for use in mechanical testing.

Solvent compatibility testing was performed by submerging test strips of material into fluids over a fixed time and temperature. Test materials were approximately 30 mm (millimeters) in length by 6 mm (millimeters) in width by 0.5 mm (millimeters) in height. Each strip was measured for both the initial dimension and mass before exposure to fluid. FIG. 4 is a table showing solvent compatibility testing parameters. The table in FIG. 4 describes the fluids used, including (1) JP8 (Jet Propellant 8) jet fuel; (2) engine oil such as MOBIL Jet Oil II from Exxon Mobil Corporation of Irving, Tex. (MOBIL is a registered trademark of Exxon Mobil Corporation of Irving, Tex.); (3) hydraulic fluid such as CASTROL BRAYCO Micronic 882 obtained from Air BP Lubricants of Parsippany, N.J. (CASTROL and BRAYCO are registered trademarks of Castrol Industrial North America of Warrenville, Ill.), and (4) deionized water. The exposure time for the JP8 jet fuel was 7 (seven) days and the exposure temperature was ambient. The exposure time for the engine oil was 24 (twenty-four) hours and the exposure temperature was 120° C. The exposure time for the hydraulic fluid was 7 (seven) days and the exposure temperature was ambient. The exposure time for the deionized water was 7 (seven) days and the exposure temperature was 49° C. Following exposure, the test strips were removed from the fluid, blotted dry of any excess liquid on the surface, and both dimensions and mass were measured. The changes following exposure were recorded. FIG. 5 is a table showing the percent mass change and the percent volume change following fluid exposure for Examples 1-4.

It has been unexpectedly discovered that the combination of HMDI as isocyanate and cylcohexyl moieties (e.g., diaminocyclohexane) as chain extenders in a siloxane-urethane/urea segmented copolymer system produces elastomeric materials that maintain flexibility at low temperatures while demonstrating superior mechanical properties. Elastomeric materials with low glass transition temperatures (less than or equal to (≤) −100° C.) and good mechanical properties have been developed and demonstrated. These are composed of siloxane-urethane/urea copolymers synthesized using segmented techniques. The disclosed materials possess high tensile strength (greater than 25 MPa), and high percent (%) elongation (greater than 250%). In addition, modulus can be controlled across a broad range (1 to 100 MPa) by adjusting hard and soft segment composition and displays a broad temperature insensitive working temperature range (approximately 250° C.). The system can be formulated into a two component mixture for practical applications.

The disclosure further provides a method for controlled synthesis of a segmented copolymer capable of displaying flexibility at low temperatures (down to −100° C.) and good mechanical properties. This is accomplished through sequential addition of components to create an alternating or segmented copolymer structure and compositional control of hard and soft segments. In addition, chain length of the siloxane component is beneficial to forming materials that show a temperature independent modulus down to −100° C. within an acceptable modulus range (1 to 100 MPa) for elastomeric materials. The disclosed compositions differ from known compositions in the fact that the polysiloxane-urethane/urea segmented copolymer compositions disclosed herein do not require an intermediate polyether segment to produce higher mechanical performance. This simplifies synthetic preparation of the system and creates a single low and sharp glass transition at low temperature (less than −100° C.) with a broad temperature insensitive modulus or working temperature range (ΔT of approximately 250° C.). The copolymer compositions disclosed herein have properties that display both high tensile strength combined with low Tg.

Figure 6:
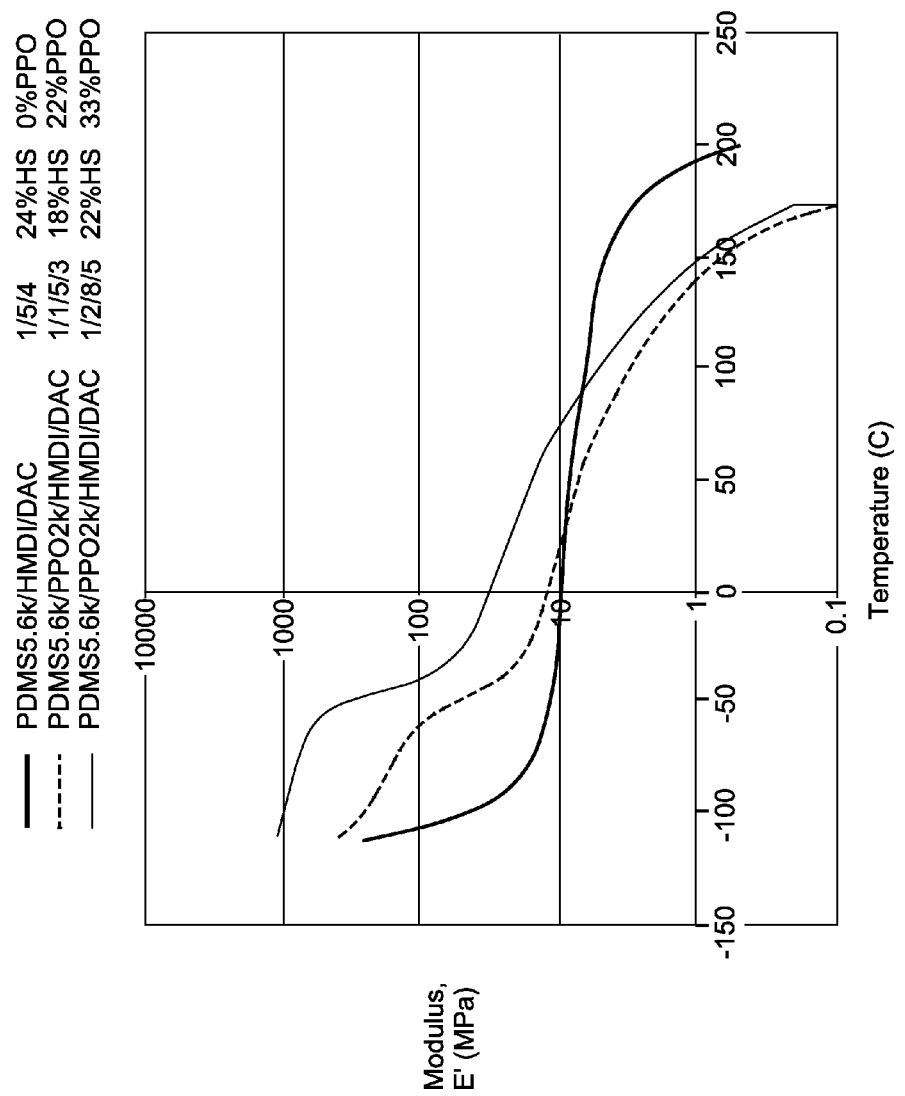
FIG. 6 is a graph showing modulus versus temperature comparisons between one of the embodiments of the segmented copolymer of the disclosure and known segmented copolymers containing polypropylene oxide (PPO)

FIG. 6 is a graph 22 showing modulus versus temperature comparisons between one of the embodiments of the segmented copolymer of the disclosure and known segmented copolymers containing polypropylene oxide (PPO). FIG. 6 shows a comparison of a siloxane urethane/urea segmented copolymer with and without an intermediate PPO interface. The legend shows compositional information for each sample in the form of siloxane/polyether/diisocyanate/chain extender [PDMS5.6 k=dihydroxyalkyl terminated polydimethyl siloxane Mn=5600, PPO2k=diamine terminated polypropylene oxide Mn=2000, HMDI=4,4'-methylenebis (cyclohexyl isocyanate), DAC=1,2-diaminocyclohexane], molar ratio of the respective components, hard segment content by weight, and polypropylene oxide content by weight. Plot line 26 shows Example 1 with 0% PPO and a hard segment content (HS %) of 24% by weight. The elongation of this material was found to be 473% with a true tensile strength of 48 MPa. The modulus versus temperature profile of this sample that does not contain a polyether segment was relatively flat between the temperature range −100° C. and 150°

C. Plot line 28 shows a sample containing 22% PPO by weight and a HS % of 18% by weight. This sample possessed an elongation of 691% and a true tensile strength of 20 MPa and gave a modulus at room temperature roughly equivalent to that shown in plot line 26 without a polyether segment. However, there was a clear dependence of modulus on temperature seen by the fact that the material steadily softened with increased temperature and eventually began to flow at 150° C. As temperature was lowered from ambient, the glass transition temperature from the polyether was evident around −50° C. rapidly stiffening the material to show a modulus over 100 MPa. Plot line 24 shows a sample containing 33% PPO by weight and a HS % of 22% by weight. This increase in the amount of PPO and hard segment content increased the mechanical properties to give a % elongation of 892% with a true tensile strength of 70 MPa. However, they served to stiffen the material at room temperature while increasing the glass transition to −40° C. compared to the sample with less PPO content but still softening considerably with rising temperature. The siloxane segmented urea/urethane examples shown here with an interfacial polyether segment and incorporating the cycloalkyl DAC as chain extender produced a significant improvement in mechanical properties over known methods. However, they also clearly demonstrated the inability of known materials to perform as flexible elastomeric materials at low temperatures (less than (<)−60° C.) due to the glass transition behavior from the polyether component.

Figure 7:
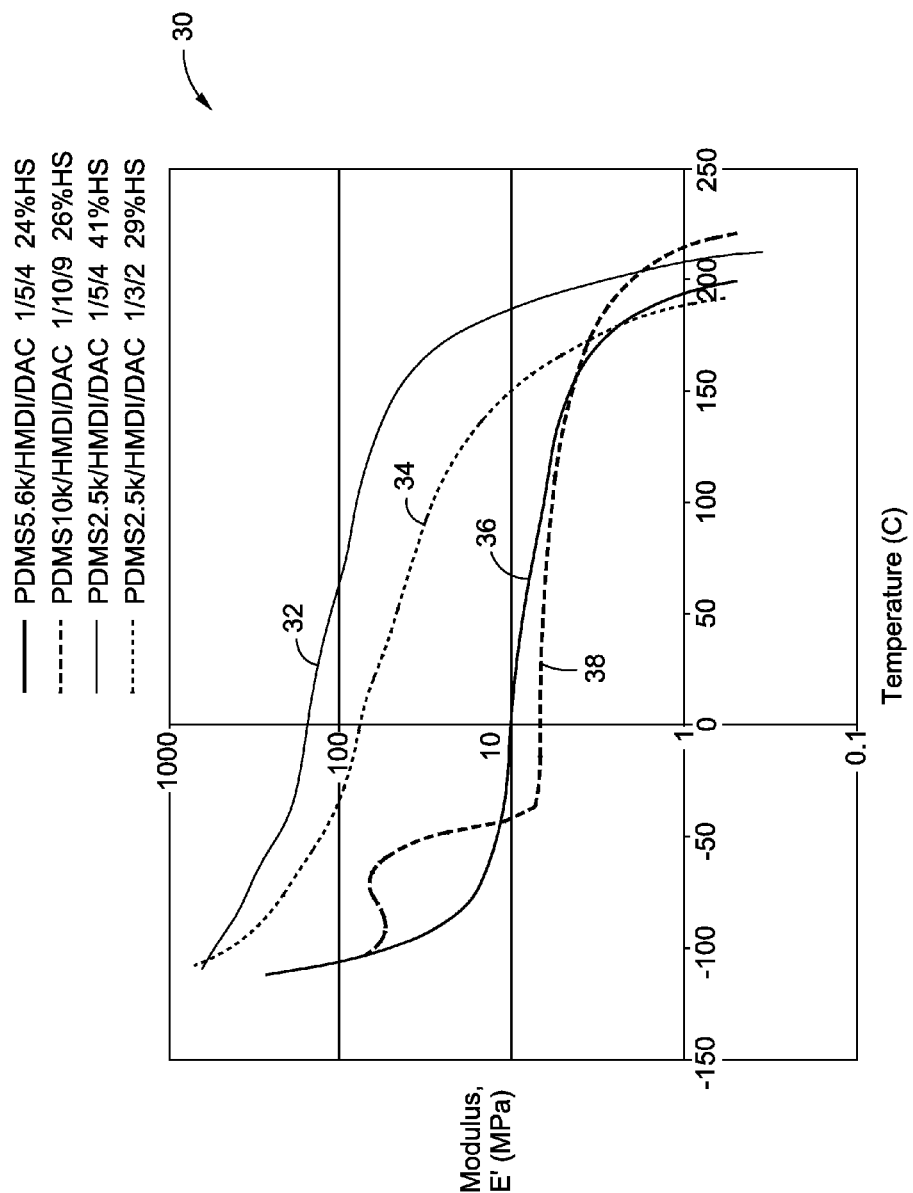
FIG. 7 is a graph showing modulus versus temperature comparisons between segmented copolymers with differing siloxane block lengths.

FIG. 7 is a graph 30 showing modulus (E' (MPa)) versus temperature (degrees Celsius (C)) comparisons between segmented copolymers with differing siloxane block lengths. Influence of siloxane chain length segments of the modulus versus temperature profile are shown in FIG. 7. The legend shows compositional information for each sample in the form of siloxane/diisocyanate/chain extender [PDMSx.xk=dihydroxyalkyl terminated polydimethyl siloxane Mn=xx00 (i.e PDMS5.6 k=Mn=5600), HMDI=4,4'-methylenebis(cyclohexyl isocyanate), DAC=1,2-diaminocyclohexane], molar ratio of the respective components, hard segment content by weight. Plot line 32 shows PDMS 2.5 k. Plot line 34 shows PDMS 2.5 k and 29% HS %. Both of these samples used siloxane soft segment components that were roughly half the size of the Mn=5600 chains used in plot line 36 (Example 1). The influence this had on modulus was dramatic in that for higher hard segment content (plot line 32), the modulus was increased an order of magnitude to above 100 MPa, while for lower hard segment content (plot line 34) there was a noticeable dependence on modulus with temperature. Plot line 36 shows Example 1 PDMS 5.6 k and 24% HS %. Plot line 38 shows PDMS10 k and 26% HS which possessed a siloxane soft segment component roughly twice as large as the PDMS Mn=5600 component. This produced a modulus versus temperature profile similar to plot line 36 (Example 1) above room temperature. However, below −40° C. there was a large increase in modulus due to crystallization of the longer PDMS segments. This series of samples demonstrated that there was a range of acceptable chain lengths for the di-functional siloxane soft segment component required to achieve the desired properties including a preferred modulus of approximately 10 MPa, a broad insensitive modulus versus temperature profile, and high tensile strength and elongation.

Figure 8:
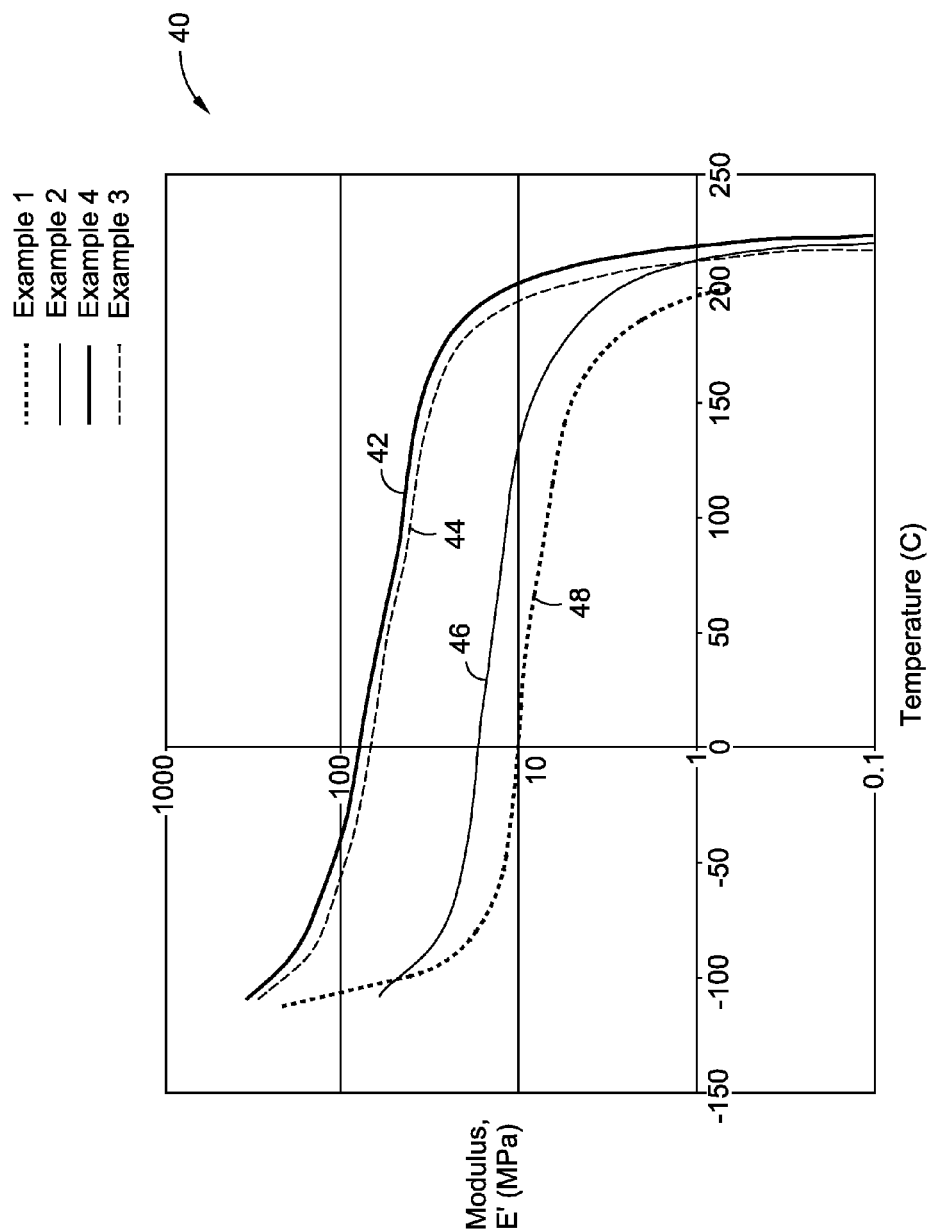
FIG. 8 is a graph showing modulus versus temperature dynamic mechanical analysis data for Examples 1-4 of the disclosure.

FIG. 8 is a graph 40 showing modulus versus temperature dynamic mechanical analysis data for Examples 1-4 of the disclosure. All samples displayed modulii between 10 and 100 MPa at room temperature along with a broad flat modulus versus temperature profile between −100° C. and 150° C. Plot line 48 shows the dynamic mechanical analysis for Example 1. Plot line 46 shows the dynamic mechanical analysis for Example 2. Plot line 42 shows the dynamic mechanical analysis for Example 3. Plot line 44 shows the dynamic mechanical analysis for Example 4.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A segmented copolymer composition comprising:
one or more $\alpha,\omega$ (alpha, omega) amine or $\alpha,\omega$ (alpha, omega) hydroxyl terminated polysiloxane first soft segments having an average molecular weight of between about 2500 grams per mole to about 10,000 grams per mole;
one or more second soft segments, wherein the one or more second soft segments is perfluoropolyether; $\alpha,\omega$ (alpha, omega) dihydroxy terminated fluoroether; $\alpha,\omega$ (alpha, omega) hydroxyl terminated poly(perfluoromethylisopropyl ether); polythiodifluoromethylene; polybutadiene; polydioxypropylphosphazene; polydioxyethylphosphazene; polydioxymethylphosphazene; polyisoprene; or polyisobutylene;
one or more diisocyanate species; and,
one or more diamine chain extenders each having an average molecular weight of less than 400 grams per mole, wherein the one or more diamine chain extenders is isophorone diamine(5-amino-1,3,3-trimethyl cyclohexanemethanamine); bis-(p-aminocyclohexyl)methane; 2,2-bis(4-aminocyclohexyl)propane; 4-methyl-1,3-cyclohexane diamine; 2,4-diethyl-6-methylcyclohexane-1,3 diamine; or a mixture of two or more thereof,
wherein the composition has a high flexibility at an environmental temperature of down to about −100 degrees Celsius, and further has a percent elongation of greater than about 250%, a high tensile strength of greater than about 25 MPa (megapascals), and a single low glass transition temperature (Tg) in a range of from about −60 degrees Celsius to about −110 degrees Celsius.

2. The composition of claim 1, wherein the one or more $\alpha,\omega$ (alpha, omega) amine or $\alpha,\omega$ (alpha, omega) hydroxyl terminated polysiloxane first soft segments is polydimethylsiloxane; poly(diphenyl-co-dimethylsiloxane); poly(methyl-3,3,3-trifluoropropylsiloxane); poly(methyl-n-octylsiloxane); poly(di-n-pentylsiloxane); poly(methyl-n-hexylsiloxane); poly(di-n-propylsiloxane); poly(methyl-n-pentylsiloxane); poly(methyl-n-butylsiloxane); poly(di-n-butylsiloxane); poly(methyl-n-propylsiloxane); poly (methylethylsiloxane); poly(methylhydridosiloxane); or polydiethylsiloxane.

3. The composition of claim 1, wherein the one or more polysiloxane first soft segments is present in an amount of from about 40% by weight to about 95% by weight, based on a total weight percent of the composition.

4. The composition of claim 1, wherein the one or more diisocyanate species is 4,4'-methylenebis(cyclohexyl isocyanate) (HMDI); cycloalkyl based diisocyanates; tolylene-2, 4-diisocyante (TDI); 4,4'-methylenebis(phenyl isocyanate) (MDI); and/or isophorone diisocyanate (IDI).

5. The composition of claim 1, wherein a combination of the one or more diisocyanate species and the one or more diol or diamine chain extenders comprises one or more hard segments, and further wherein the one or more hard segments is present in an amount of from about 5% by weight to about 60% by weight, based on a total weight percent of the composition.

6. The composition of claim 1, wherein the composition has a temperature insensitive modulus between a range of from about −100 degrees Celsius to about 150 degrees Celsius.

\* \* \* \* \*